E. WIEDINGER.
GRAIN WEIGHER.
APPLICATION FILED FEB. 9, 1914. RENEWED SEPT. 19, 1918.
1,300,314.
Patented Apr. 15, 1919.
2 SHEETS—SHEET 1.
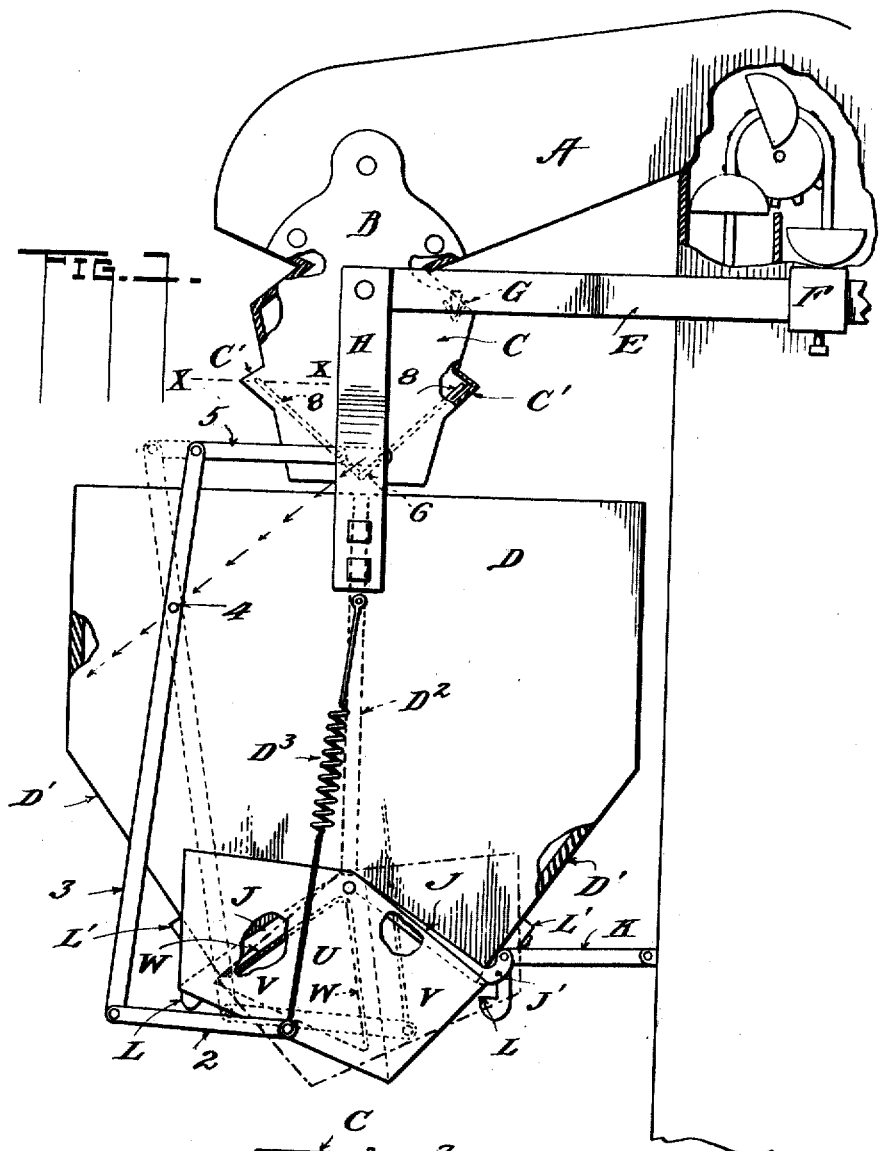
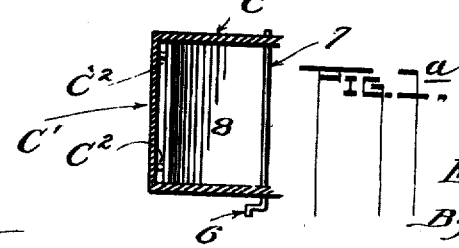
Witnesses:
Eunice Beckum
Marie Dacey
Inventor
Edward Wiedinger
By L. N. Thurlow
Atty.

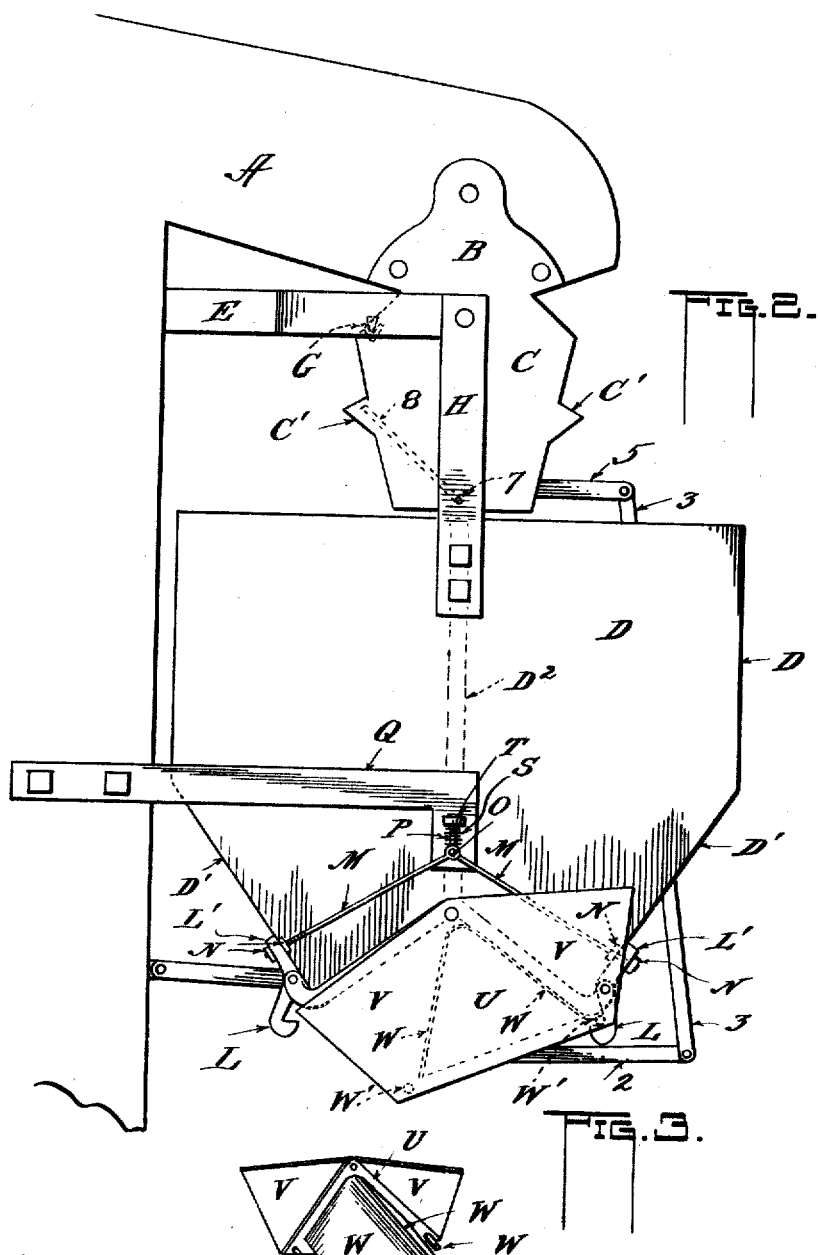

UNITED STATES PATENT OFFICE.

EDWUARD WIEDINGER, OF PEORIA, ILLINOIS.

GRAIN-WEIGHER.

1,300,314.　　Specification of Letters Patent.　　Patented Apr. 15, 1919.

Application filed February 9, 1914, Serial No. 817,630. Renewed September 19, 1918. Serial No. 254,862.

*To all whom it may concern:*

Be it known that I, EDWUARD WIEDINGER, citizen of the United States, residing at Peoria, in the county of Peoria and State of Illinois, have invented certain new and useful Improvements in Grain-Weighers; and I do hereby declare that the following is a full, clear, and exact description of the invention, which will enable others skilled in the art to which it appertains to make and use the same.

This invention relates to improvements in grain weighers.

The main object of the invention is to construct a weigher of simple construction that will be positive in operation and accurate of measure.

Another object is to furnish a weighing hopper with a valve or gate that will be positively latched or locked in the grain receiving position until the exact amount of grain to be delivered into the hopper has been received, said valve or gate being then released in an absolutely positive manner for the discharge, means being included in addition to the weight of grain which moves the valve for positively moving the valve to an opposite position where it is positively locked in place.

Another object is to so place the valve or gate in the bottom of a double-compartment weighing hopper that the weight of grain resting upon it will positively reverse its position and close the opposite grain receiving compartment of said hopper, means being combined therewith for operating a second valve used for directing the grain into either compartment of said hopper.

Another and important object is to mount upon a structure other than the weighing-hopper the parts that first receive the weight of the grain so that said hopper can in no way be prematurely operated by the force of the grain entering it from the elevator or other part.

Besides the above objects the invention relates to certain details of construction as will appear in the following specification and from the drawing presented herein, in which, Figure 1 is an elevation of one side of my improved weigher.

Fig. 1ª is a horizontal section on line *x x*, Fig. 1.

Fig. 2 is an elevation of the opposite side of the weigher, and,

Fig. 3 shows in perspective a valve or gate used in the bottom of the weighing hopper.

A indicates the head of an elevator from which the grain is to be discharged into the weigher, and B is a casting attached to each side of the elevator head and terminating below in a hopper C whose bottom is open for the discharge of grain into the weighing hopper D beneath it, the latter being divided into two compartments by means of a central partition $D^2$. E is a scale-beam provided with a poise F. This is pivoted in any suitable manner at G on opposite sides of the hopper C for example the weighing hopper D being suspended from the short end of the said scale-beam by means of the hanger straps H. Said weighing hopper D is preferably constructed substantially as shown in the figures. That is to say, the walls of its upper half are substantially vertical while the lower portions slant at an angle inward or toward one another to form the slanting side portions D', the bottom of the hopper between the terminals of said slanting sides being open, the sides of the hopper being notched in the form of an A. J indicates an A-shaped frame bolted to each side of the weighing hopper and forms the boundary for the described A-shaped opening. In Fig. 1 one of the extensions of this A-shaped frame is extended as at J' to which is pivoted one end of a link K whose other end is suitably pivoted at the elevator and serves as a guide for the hopper D causing it to move in a substantially vertical line in the weighing operation.

In Fig. 2, to each extremity of the said frame J is pivoted between its ends a hook L having an arm extension L'. Extending through the arm of each hook is a rod M provided with nuts N whereby the hooks and rods can be adjusted relatively. The opposite ends of the arms are connected by a pivot pin O which extends through and is guided in a vertically arranged slot P in a member Q attached to the elevator A. S is a compression spring lying between a lug T on the member Q and the ends of the rods M. The purpose of the spring is to at all times keep a yielding pressure upon said rods M whereby the hooks L will be held in position to be engaged by certain parts to be described.

Pivoted at the apex of each frame J at each side of the hopper D is a valve or gate shown in Fig. 3. This consists of end portions U provided with extended wing portions V for preventing the escape of the grain sidewise from the hopper-compartments, and extending between the end members U is a part comprising two portions W lying at an angle to one another to form an inverted V, as shown, to constitute a closure for either compartment of the hopper. Extending inward at each corner of one end U, Fig. 3, or that adjacent to the hooks L is a pin W' each of which engages one of the hooks. Pivoted to the bottom of the valve at one end U, Fig. 1, is one end of a rod or link 2. Attached to this point also is one end of a spring $D^3$ whose other end is attached to the hopper D or other part vertically in line with the pivot of the valve.

The other end of the link 2 is pivoted to the lower end of a lever 3 pivoted between its ends at 4 on the hopper D. Its upper end has pivoted to it a second rod or link 5 one end of which engages a crank arm 6 of the shaft 7 of a valve 8, Fig. 1$^a$, lying within the hopper C. Said hopper at opposite sides, as shown in Figs. 1 and 2, has a recessed portion C' into which the upper portion of the valve is adapted to enter and in which it lies. As shown in Fig. 1$^a$ said valve preferably rests upon a stop or stops $C^2$ so that a space is left behind the valve when thrown into said recessed part C' whereby any material that may get behind the valve or between it and the hopper C will fall out and cannot therefore hold said valve from properly taking its proper position within said portion C'.

Years of experience has shown that the grain to be weighed must not drop directly into and upon the bottom of a weighing hopper or against any valve or portion forming a part of or carried by it since this often results in prematurely tripping the mechanism and a loss of grain. In consequence of this I mount the valve 8 on some part of the apparatus other than the said weighing hopper since said valve is the part that first receives the grain. The grain falling upon the valve 8 is deflected by it in the direction indicated by the darts, Fig. 1, into the hopper D striking upon the vertical side of the latter thence traveling down the slanting part D' to and upon the valve or gate and this is only after its force has been spent. It is clear that if the force of the grain were directed upon the bottom of the hopper B or some other substantially horizontal part of it, together with the weight of that lying therein, its force would operate to trip the hopper prematurely and discharge the load before the proper or full weight had been deposited in said hopper. It is found in practice that this results. If the valve 8 were carried by the hopper D the same result would obtain. Therefore, by placing upon a member separate from the hopper the part that first receives the cast of grain the hopper cannot be influenced by the throw or cast of grain, and the weight of grain delivered from the hopper must always correspond with the weight for which the poise on the scale beam is set. The discharge opening of the elevator within the hopper C is constricted so that a small steady flow of the grain will pass into said hopper all of which will be deflected by the valve 8 as described. That is to say a part of it in striking the valve 8 and being deflected by it toward the side of the weighing hopper D will result in deflecting all of the flow from said elevator in the same direction.

The grain enters one compartment of the hopper D until the weight overbalances the weight of the poise F whereupon the said valve W which has been held in the position shown in Fig. 1 by one of the hooks L, Fig. 2, is released. This release is occasioned by the descent of the hopper together with the hooks which are mounted thereon. Since the pivot member O of the rods M does not move downward but remains practically stationary on the hanger Q and since the distance between the said pivot and the lowered position of the arms of the hooks is increased in the descent of the latter said hooks will be automatically moved outward or away from the valve-holding position releasing the valve from the hook that may be holding it.

The weight of grain resting upon the valve now swings that member on its pivot with a sharp sudden movement toward its opposite position and as this takes place the spring $D^3$ before described, which, in being attached at one end to the middle of the valve and at its other end to the hopper vertically in line with the pivot of said valve assists in positively drawing the valve over to its opposite position mentioned after the point on the valve to which the spring is connected has passed beyond the center or pivot of the said valve. The two surfaces of the valve W are inclined at such an angle to one another that when the valve opens from one of its positions the weight of grain in its passage from the emptying compartment of the hopper in bearing upon the surface of the valve lying beneath said compartment positively forces said valve over to its opposite position to close the opposite compartment.

As the hopper is relieved of its weight it rises due to the poise F to its grain receiving position. The hooks in this action can now regain their normal positions and as the valve swings to the opposite position its pin W' at that side strikes and forces back the adjacent hook L which latter then engages beneath it due to the spring S, thus holding the valve positively so that the weight of grain now placed upon it in the compartment beneath which the valve now lies will be properly sustained.

As the valve swings to its new position the valve 8 in the hopper C is swung to the opposite position to deflect the grain into the opposite compartment upon the valve W in its new position. The distance between the pivot of the lever 3 that operates the valve 8 and its point of connection with the link 2 is much greater than the distance between said pivot and the link 5 of the valve 8 so that the weight of grain moving the valve or gate W can easily and positively swing the said valve 8 regardless of the weight of grain falling upon it from the elevator and in addition to this difference in leverage the weight of the discharging grain upon the said valve or gate W is many times greater than the weight of grain falling upon said valve 8.

The relation of the lever 3 and the link 5 is a pivotal one so that the hopper may rise and fall without changing the position of the valve 8 or moving it in the least.

As the hopper D returns to its normal or raised position the hooks must be permitted to have free pivotal movement in order that the valve W in its movement to the opposite position can engage the hook at the side to which it moves by one of the pins W' and cause said hook to move outward and then pass beneath and engage said pin. This action is permitted through the ability of the pin O to play up and down in the slot P the spring S, of course, at all times keeping a yielding pressure thereon. The A-shaped frame J at the bottom opening of the hopper forms a marginal edge and brace for the hopper and the ends of the valve W overlie them. The pins W' of the valve are inside the end on which they are carried and extend toward the opposite end of the valve, as shown in Fig. 3, so as to be in position to engage the hooks L.

Other devices of which I am aware do not employ a spring such as D³ for operating the valve or gate W as an assistance to the weight of the grain. The use of the spring as arranged is most positive and results in an exceedingly quick operation of the valve and little likelihood of loss of grain.

The spring is constant in its pull and acts instantly whereas a weight is variable in its power and slower, depending upon its position beyond the central point of its travel.

Again, the hooks L in my device are spring-controlled thus making their action positive and yet elastic so that the valve W can be locked automatically and positively. In addition, I believe the peculiar relation of the lever mechanism for operating the valve 8 from the valve or gate W to be new and novel.

The described nuts N on the ends of the rods M are for a very special purpose their adjustment constituting one of the important features necessary to the proper functioning of the weigher, each hook being set at a position to properly and positively engage its respective pin W' on the valve or gate W.

The hooks are so adjusted relatively to the rods M that when the weight of grain in the hopper just overbalances the poise F, the pin O as it reaches the bottom of the slot P in the descent of the hopper will cause the hook in action to be drawn away from the pin W' to release the valve.

Now, if one of the hooks were not adjusted so as to be operated at the same moment and to the same extent grain delivered from the corresponding compartment would not agree with that of the other. The distance from each hook to the pivot point O must be the same so that exactly the same degree of movement will be imparted to both said hooks.

Since there is likely to be some variation in the parts when assembled the adjustment of the hooks and rods relatively is required whereby to bring about the proper relation for proper operation.

Again, differences may exist since the two compartments of the hopper may vary in weight although belonging to a single structure. That is to say, one side of the hopper may be heavier or lighter than the other so that the weight of grain delivered from the compartments would vary.

The adjustment is necessary for this reason and in adjusting for exact measurements the grain is weighed from one side of the hopper and the weight noted, then grain is weighed from the opposite side to determine whether the two weights correspond. If they do not agree, a nice adjustment of the nuts N readily brings the result.

This then is a very important feature not used by other weighers to my knowledge.

Various changes may be made in my improved weigher that may fairly fall within the invention and the meaning of the appended claims and having thus described my invention I claim:—

1. A grain weigher including in its construction a hopper having two compartments, a valve or gate pivoted on the hopper adapted to alternately close one and open the other of the compartments, a grain delivering part overhanging the hopper, a valve therein adapted to divert grain to one or the other of the hopper compartments including an arm to operate it, a lever supported between the ends on the hopper, a link connecting the said arm with one extremity of the lever, and a link connecting the first named valve with the other extremity of said lever, the movement of the said valve to discharge the grain from either compartment moving the valve in said grain delivery part.

2. A grain weigher including in its construction a hopper having two compartments, a valve or gate pivoted on said hopper adapted to alternately close one and open the other of the compartments, a delivery spout adapted to deliver into either compartment, a valve therein adapted to divert grain to one or the other of the said compartments including an arm, a lever supported between its ends in a substantially upright position having a long and a short arm, a link extending substantially at right angles to the short arm of the lever and pivotally connected to it and the arm of the valve, and a link substantially parallel to the first named link pivotally connecting the first named valve with the long arm of the lever and lying substantially at right angles to the latter, the movement of the last mentioned valve to discharge the grain from one of the compartments moving the valve in the said delivery spout to direct the grain into the opposite compartment.

3. A grain weigher including in its construction a hopper having two compartments, a valve or gate pivoted on the hopper adapted for closing one or the other of the compartments, a grain delivering part overhanging the hopper, a valve pivoted therein adapted to divert grain to one or the other of the hopper compartments including an arm to operate it, a lever pivoted on the hopper having an upper short arm and a lower longer arm, the pivot of the lever being spaced widely from a line drawn between the pivots of the valves, and a link connected to each end of the lever, whereby each can have operative engagement with one of the valves.

4. A grain weigher including in its construction a hopper having two compartments, a valve or gate pivoted on the hopper adapted for closing one or the other of the compartments, a grain delivering part overhanging the hopper, a valve pivoted therein adapted to divert grain to one or the other of the hopper compartments including an arm to operate it, a lever pivoted on the hopper having an upper short arm and a lower longer arm, the pivot of the lever being spaced widely from a line drawn between the pivots of the valves, a link connecting each valve with one end of the lever, and means operatively connected to the described mechanism to elastically control the valve of the hopper to assist in positively moving the same to either extreme position.

5. A grain weigher including in its construction a pivoted weighing hopper arranged to move in a substantially vertical line and having two compartments separated by a wall open at their bottoms, each end wall of said hopper having an A-shaped recess in its lower portion, the separating wall terminating substantially at the angle of said recess, a swinging valve having its pivot on the hopper substantially at the angle of the recess adapted to close either compartment, a delivery part stationed above and separate from the hopper, a valve in said part adapted to swing to two different positions, a lever pivoted between its ends upon the side of the hopper, its pivot being spaced from a line drawn between the pivots of the described valves, links connecting the valves with opposite ends of the levers, means to positively hold the valve of the hopper closed upon one of the compartments, and automatically moved to release said valve when the hopper lowers under its charge of grain, said valve being moved toward its opposite position under the weight of the grain, and means operatively connected to the valve adapted to assist in positively carrying the same to its said opposite position.

6. In a grain weighing apparatus of the class described, the combination of a weighing hopper having two discharge openings in its bottom, a pivotally mounted valve to alternately expose one of the openings and close the other, a spring operatively connected to the valve and mounted on a part of the apparatus and adapted for positively moving the valve past the middle point of its travel.

7. In a grain weighing apparatus of the class described, the combination of a weighing hopper having two compartments each provided with an opening in its bottom for the discharge of grain, a pivoted valve or gate adapted for covering and closing either of the openings, means for holding and for releasing the valve or gate when a predetermined amount of grain has been received in said hopper, said valve having a face inclined at an angle and arranged to receive the weight of discharging grain upon it, and a spring attached at one end to the valve or gate and at its other end to a part above the pivot of the valve and adapted to positively move the valve to either of its positions.

8. A weigher including a supporting structure, a vertically movable weighing hopper to receive grain and having two compartments and including a suspending scale-beam, a valve or gate in the bottom of the hopper adapted to close one or the other of the compartments, a latch to engage said gate or valve in one of its positions, and means in permanent engagement with said latch and in use having a fixed length and attached to a part of the supporting structure in the movement of the hopper downward away from said part to operate the latch to release the said valve.

9. In a weigher a member for the discharge of grain, a weighing hopper separate from the same having two compartments separated by a central vertical partition and suspended beneath the member for receiving grain therefrom and including a scale beam, said weighing hopper adapted to rise and fall in a vertical line and having a discharge opening in its bottom for each compartment, a valve pivoted at the lower terminus of the said partition and having oppositely disposed walls lying at an angle to each other, each adapted to close the opening of one of the compartments, a latch carried by and pivoted relatively to the hopper at each limit of the travel of the valve, a member engaging each latch and attached to a stationary part of the apparatus, and means elastically in control of each said member and its latch.

10. In a weighing machine, the combination of a movable balanced hopper comprising two compartments each open at the bottom, a valve or gate pivoted on the hopper and adapted to close one or the other of the said compartments, a latch pivoted to each of two opposite sides of the hopper and adapted each to engage and hold the valve or gate in one of its closed positions, a fixed support, a separate member connected with each latch and attached to the support, and means to adjust each latch with respect to the member with which it is associated.

11. In a grain weigher, the combination of a supporting structure and a suspended hopper arranged for vertical movement including two separate discharge openings in its bottom, a valve structure arranged to close one or the other of the openings, a latch carried by the hopper to engage a part movable with the valve and hold it in its receiving position, and a member engaging the latch and a part of the supporting structure independent of the hopper, said hopper adapted as it descends to discharge the grain to move away from the place of connection of said member with the support and thereby through said member operate the latch to release said valve.

12. In a grain weigher, the combination of a supporting structure and a suspended hopper arranged for vertical movement including two separate discharge openings in its bottom, a valve structure arranged to open and close the openings in an alternate manner, a latch mounted on the hopper to engage a part movable with the valve for holding said valve in the grain receiving position, a member engaging the latch at one end and a part of the supporting structure at the other and adapted at that end to move in an upward direction relatively to the latter but limited in its downward direction of movement with respect thereto and adapted as the hopper descends to its lowest position to move the latch and release the valve.

13. In a grain weigher, the combination of a supporting structure and a suspended hopper arranged for vertical movement including two separate discharge openings in its bottom, a valve structure arranged to close one or the other of the openings, a latch to engage a part movable with the valve to secure it in one of its extreme positions, a member engaging the latch and a part of the supporting structure and adapted for movement in an upward direction relative to the latter but limited in a downward direction with respect to the same and adapted as the hopper descends to its lowest position to move the latch and release the valve, and means to maintain pressure downward elastically upon the member where it engages the supporting structure.

14. In a grain weigher, the combination of a supporting structure and a suspended hopper arranged for vertical movement including two separate discharge openings in its bottom, a valve structure arranged to close one or the other of the openings, a latch mounted on the hopper to engage a part movable with the valve to secure said valve in its grain-receiving position, a member engaging the latch and mounted on and movable in a vertical line relatively to a part of the supporting structure and adjustable with respect to the former, and means to adjust the member and the latch relatively and for maintaining such adjustment.

15. In a grain weigher, the combination of a support, a hopper adapted for vertical movement relatively to it including an opening in its bottom, a valve pivoted on the hopper for opening and closing said opening, a latch pivoted on the hopper adapted to engage a part of said valve, and a member engaging the valve at one end and mounted at its other end on the support and limited in its downward movement at that end by said support and adapted as the hopper and latch descend to cause the latter to be withdrawn from and release said valve.

16. A grain weigher including in its construction a hopper having two compartments, a substantially balanced valve or gate pivoted thereon adapted to alternately close one of the compartments and open the other, a grain delivery part, a valve therein adapted to divert grain into either compartment, a lever supported between its ends, a link connecting the last named valve with one end of the lever, a link connecting the valve or gate with the other end of the lever, mechanism to hold the valve in either of its positions and adapted to release it when the hopper has received its load, and a spring attached at one end to the said valve or gate and at its other end to a part separate from said valve, the line of pull of the spring being through the point of pivotal support of the valve when the latter is midway its extreme positions, the ends of the springs being at opposite sides of said point of support.

17. In a grain weigher, the combination of a weigh hopper, a valve pivotally mounted thereon adapted for discharging the grain and arranged to move to two different positions for such discharge, and a spring constantly under strain attached at one end to the valve and at its other end to a stationary part and adapted to positively move the valve to either extreme position after said valve has passed its middle point of travel, the said ends of the spring lying at opposite sides of the pivot of said valve.

In testimony whereof I affix my signature, in presence of two witnesses.

EDWUARD WIEDINGER.

Witnesses:
 L. M. THURLOW,
 W. I. SLEMMONS.